INVENTORS G. K. BURNS
E. V. MADSEN
BY R. C. Lipton
ATTORNEY

United States Patent Office 3,328,766
Patented June 27, 1967

3,328,766
BUFFERING CIRCUIT FOR REPETITIVE TRANSMISSION OF DATA CHARACTERS

Gordon K. Burns, Colts Neck, and Eric V. Madsen, New Shrewsbury, N.J., assignors to Bell Telephone Laboratories, Incorporated, New York, N.Y., a corporation of New York Filed Jan. 12, 1965, Ser. No. 424,996
7 Claims. (Cl. 340—172.5)

Figure 1:
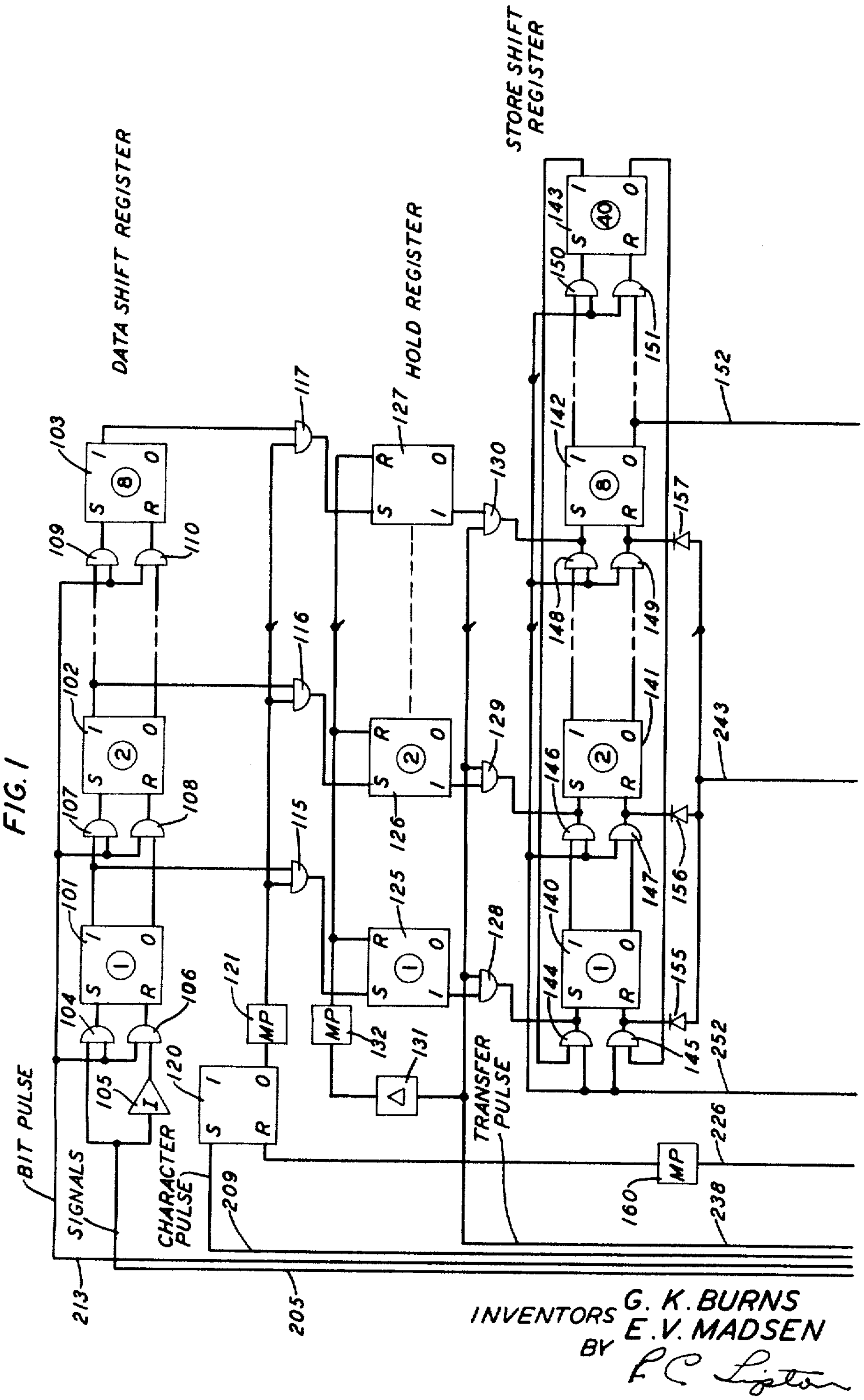

This invention relates to a data transmitting circuit and, more particularly, to a circuit which provides repetitive transmission of blocks of data characters in response to an external signal.

It is a broad object of this invention to provide repetitive transmission of data.

Interconnection of data communication machines requires substantially error-free operation of the transmitting machine and the interconnecting communication system. To insure that the received data is free of such errors, error detecting codes are employed, such as the well-known parity check codes. These codes permit a receiving circuit to examine the data bits and determine whether the code bits have been correctly received. In certain of these systems, the receiving station returns a request to resend signals to the transmitting station in the event that an error is detected. The transmitting station is arranged to respond to the request signal by resending a previously transmitted block of characters, including the mutilated character. This arrangement preferably includes a storage circuit for maintaining a running store of previously transmitted characters together with a control circuit for stopping the transmitting machine and sending the characters in the store in response to the request signal.

In the event that the signaling speeds of the data machines differ, speed conversion circuits must be provided to render the machines compatible. These circuits may include a buffering circuit to accept data from the machine at one signaling speed, assemble the data bits and apply them to the outgoing line at another (higher) signaling speed. If error correcting is required, it is then desirable to combine a speed conversion circuit and data repetition circuit.

Accordingly, it is an object of this invention to provide data repetition and speed conversion. It is apparent, however, that when a request signal is received, the buffer circuit is generally storing partially assembled data bits. In addition, the data machine completes the application of the remainder of the concurrently generated data character to the buffer before stopping. It is therefore necessary that provision be made for the data bits assembled in the buffer during and subsequent to the reception of the request signal.

It is therefore another object of this invention to eliminate the contention between the speed conversion circuit and the character store to apply signals to the outgoing line after reception of the request signal.

In accordance with a specific embodiment of the invention, the buffering circuit includes an input shift register for assembling the data bits and an output shift register together with a clock circuit for shifting out the data bits at a rate independent of the data machine signaling speed. The output shift register also includes additional shift register stages for storing previously transmitted characters and for recirculating the characters for retransmission in the event that a request to resend a signal is received.

It is a feature of this invention that the data machine must complete the generation of a character and stop before the recirculated characters may be retransmitted.

It is another feature of this invention that retransmission is delayed until the final character generated by the data machine is assembled and transmitted to the outgoing line.

Figure 2:
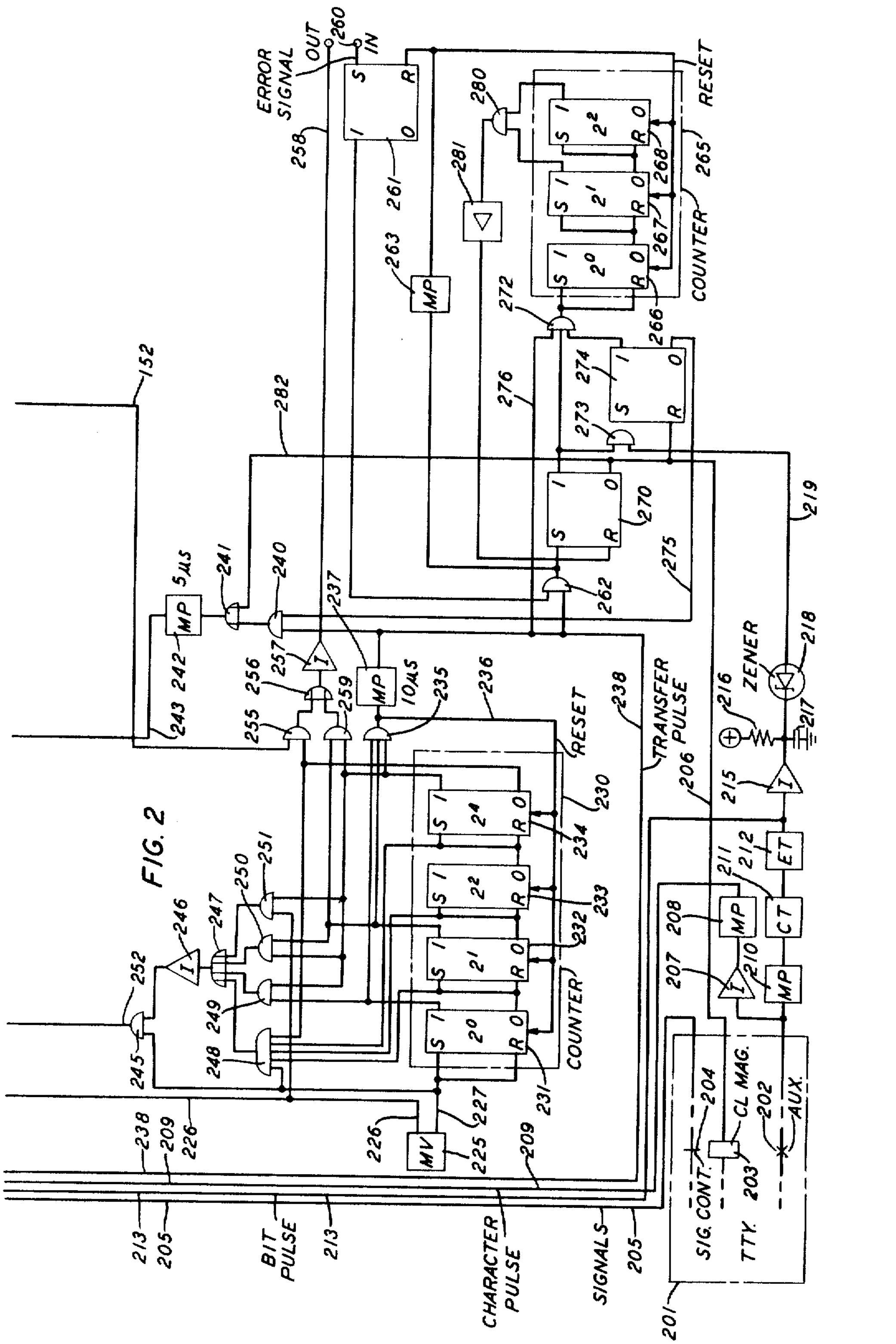
Figure 3:
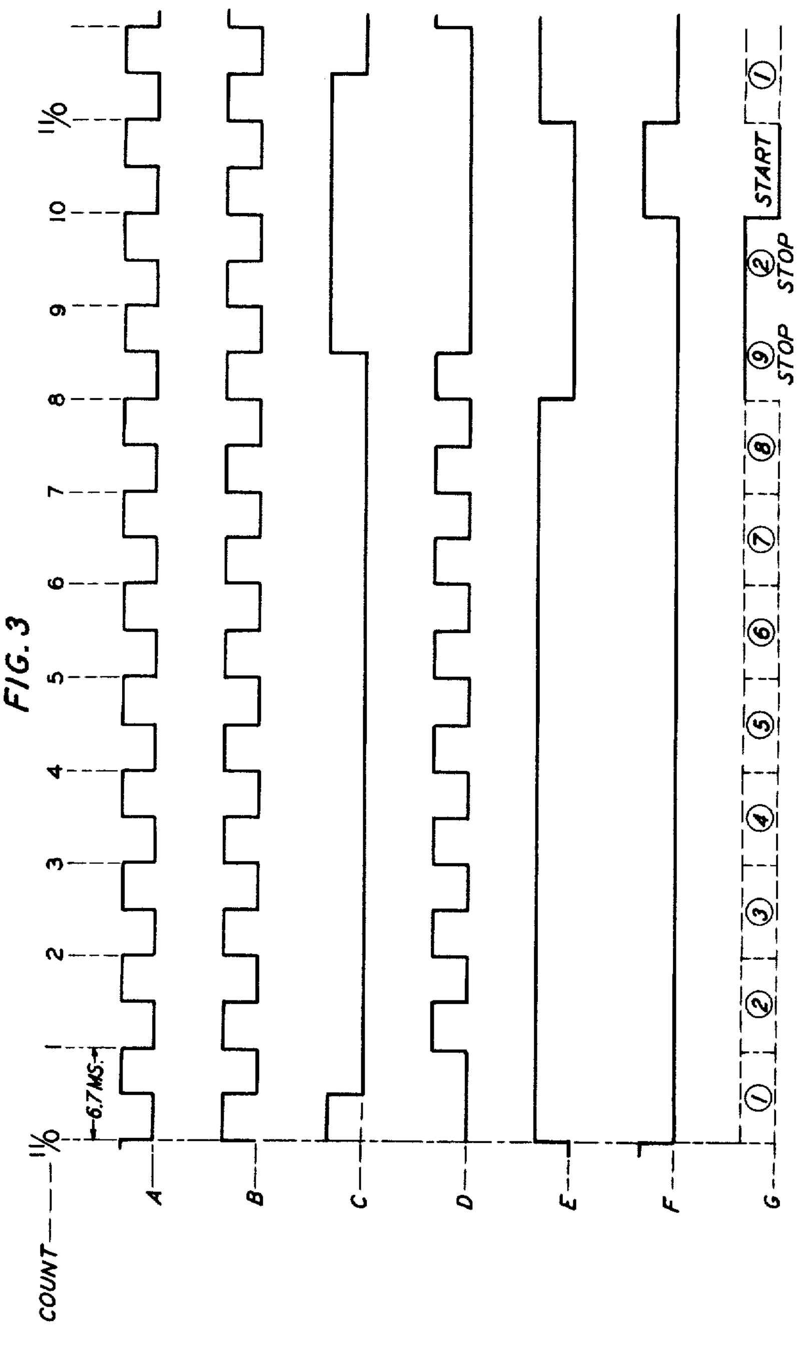

The means for fulfilling the foregoing objects and the practical embodiment of the features of this invention will be fully understood from the following description taken in conjunction with the accompanying drawing wherein:

FIGS. 1 and 2, when vertically arranged, with FIG. 1 on top, show the details of circuits and equipment which cooperate to form a data repetition and speed conversion circuit in accordance with this invention; and FIG. 3 illustrates the wave forms produced by several of the circuits shown in FIG. 2.

Referring now to FIG. 2, a source of data characters is shown comprising a teletypewriter generally indicated by block 201. Teletypewriter 201 includes an arrangement for sensing punched tape and producing thereby serial data characters. Accordingly, teletypewriter 201 includes signaling contacts 204, which contacts open and close to generate the appropriate data elements.

Lead 205 extends to contacts 204, which are normally closed as shown in FIG. 2 to further extend lead 205 to a source of positive potential, not shown. Accordingly, a positive or high potential is normally applied to lead 205 constituting the normal idle marking condition. Upon sensing a punched character in the tape, signaling contacts 204 open and close in accordance therewith to pass to lead 205 an eleven-element character, which character comprises a start element, two stop elements and eight intelligence elements, which includes seven information bits and a parity bit. In accordance with the present embodiment, teletypewriter 201 is arranged to transmit at a speed of a hundred and ten elements or bits per second.

Teletypewriter 201 also includes clutch magnet 203 which, when energized, releases the sensing mechanism for one cycle to permit the operation of signaling contacts 204 to send one character. Clutch magnet 203 is interconnected between a source of low potential, not shown, and lead 206. Accordingly, when lead 206 is in the high potential condition, as described hereinafter, the difference in the voltage potential across clutch magnet 203 provides current to energize the clutch magnet. Conversely, the application of a low potential condition to lead 206 de-energizes clutch magnet 203, thereby stopping teletypewriter 201 when the transmission of the character is terminated and maintaining lead 205 in the idle marking condition.

Teletypewriter 201 also includes auxiliary contacts 202 which contacts are normally open, as shown in FIG. 2. During the generation of the start element, however, auxiliary contacts 202 close to apply a source of high potential therethrough to inverter 207 and monopulser 210. Subsequently, during the generation of a stop element by signaling contacts 204, auxiliary contacts 202 reopen, removing the application of the high potential condition from inverter 207 and monopulser 210.

Inverter 207 responds to the removal of the high potential condition applied thereto during the stop element by passing a high potential condition to monopulser 208. Monopulser 208, in turn, generates a positive pulse, which pulse is applied to character pulse lead 209. Thus, a positive pulse is applied to lead 209 near the termination of the generation of the data character and, more specifically, during the production of a stop element.

Recalling now that auxiliary contacts 202 apply a *high* potential condition to monopulser 210 during the generation of the start element, monopulser 210, in turn, passes a positive pulse in response thereto to character timer 211. Character timer 211 comprises a monostable multivibrator which, in response to the positive pulse, produces at the output thereof a high potential condition which persists for a duration equivalent to the interval required by teletypewriter 201 to generate the eight intelligence elements. Thus, a high potential condition is applied to element timer 212 simultaneously with the generation of the eight intelligence elements.

Element timer 212 comprises a free-running multivibrator which is enabled by the high potential condition to produce timing pulses at the signaling speed, namely, 110 pulses per second. In addition, element timer 212 is arranged to provide the first pulse and each succeeding pulse at the approximate midpoint of each of the intelligence elements. Accordingly, bit pulses at the element midpoints are passed to lead 213.

The output of element timer 212 is also connected to inverter 215. Thus, during the generation of the data characters, inverter 215 applies negative pulses to the upper plate of capacitor 217, as shown in FIG. 2. Accordingly, a negative potential is built up by the charge stored on the upper plate of capacitor 217 and applied through Zener diode 218 to lead 219 during the transmission of data characters by teletypewriter 201. It is noted that with teletypewriter 201 operating, bit pulses are not produced during the start and stop elements and capacitor 217 proceeds to charge to a positive potential by way of resistor 216. The generation of the next character, however, reapplies the negative charge to capacitor 217. In the event, however, that teletypewriter 201 stops, the upper plate of capacitor 217 continues to charge by way of resistor 216 to positive battery. After about 73 milliseconds, the positive charge on capacitor 217 exceeds the threshold of Zener diode 218 and the diode breaks down to apply a positive-going transition to lead 219. As described hereinafter, the outgoing signaling speed is 150 bits per second, wherein a data character interval comprises 73 milliseconds. Accordingly, a positive transition is applied to lead 219, 73 milliseconds or one output data character interval after teletypewriter 201 stops.

The data characters on signaling lead 205 are applied to gate 104, FIG. 1, and by way of inverter 105 to gate 106. Gates 104 and 106, in turn, are connected to flip-flop 101 which constitutes the first stage of a data shift register. As shown in FIG. 1, the data shift register includes eight stages, the second stage thereof including flip-flop 102 and the eighth stage thereof including flip-flop 103.

Assuming now that teletypewriter 201 is transmitting a data character, the generation of the first intelligence element is applied via signaling lead 205 to gate 104 and the inversion thereof to gate 106. As previously described, at the approximate midpoint of the intelligence element, a positive pulse is applied to bit pulse lead 213, which lead extends to the other inputs of gates 104 and 106. In the event that the first intelligence element constitutes a marking or high potential condition, the application of the bit pulse to gate 104 together with the application of the high potential condition to gate 104 by lead 205, produces a positive pulse at the output of gate 104 which pulse, in turn, is applied to the input set terminal of flip-flop 101. Accordingly, flip-flop 101 is placed in the set condition, producing at the output set terminal thereof a high potential condition. Conversely, if the first intelligence element is a spacing signal, the low potential condition applied to inverter 105 results in the application of a high potential condition to gate 106. Thus, upon the generation of the bit pulse, gate 106 passes a positive pulse to the input reset terminal of flip-flop 101, driving the output reset lead to the high potential condition. Accordingly, if the first intelligence element is a marking bit, flip-flop 101 is set, and, conversely, if the first element is a spacing bit, flip-flop 101 is reset.

When the second intelligence element is generated by teletypewriter 201 and the bit pulse at the element midpoint is applied to lead 213, flip-flop 101 is placed in the condition corresponding to the second intelligence element in the same manner as previously described. Concurrently therewith, the bit pulse on lead 213 is applied in parallel to gates 107 and 108. In the event that the first intelligence element was marking, and flip-flop 101 was previously set, the other input to gate 107 is in the high potential condition since it extends to the output set terminal of flip-flop 101. Accordingly, gate 107 passes a positive pulse to the input set terminal of flip-flop 102 thus shifting the first intelligence element to the second stage of the data shift register. Conversely, if the first intelligence element was a spacing bit, and flip-flop 101 was reset, a high potential condition is applied to the other input of gate 108, whereby, upon the application of the bit pulse, flip-flop 102 is reset. It is thus seen that the second intelligence element is placed in flip-flop 101 and the first intelligence element is shifted to flip-flop 102. In the same manner, upon the generation of each of the succeeding intelligence elements, the corresponding bits are applied to and shifted through the data shift register until, at the termination of the character, the first data element is stored in flip-flop 103, the seventh data element is stored in flip-flop 102, and the eighth data element is stored in flip-flop 101. Accordingly, the data shift register stores the eight intelligence elements of the data character at the termination of the transmission thereof.

As previously described, during the generation of the stop element, a pulse is applied to character pulse lead 209, which lead extends to the input set terminal of flip-flop 120. As described hereinafter, monopulser 160 then applies a pulse to the input reset terminal of flip-flop 120, whereby the flip-flop is reset. The output reset terminal of flip-flop 120 thus goes to the high potential condition, whereby monopulser 121 generates at the output thereof a positive pulse.

The output of monopulser 121 is connected to one input of gate 115. The other input to gate 115 is connected to the output set lead of flip-kop 101. Accordingly, on the generation of the pulse by monopulser 121, gate 115 passes a pulse therethrough in the event that flip-flop 101 is set. Thus, gate 115 passes a pulse when the eighth intelligence element is a marking signal.

The output of monopulser 121 is also connected to gate 116 and since the other input to gate 116 is connected to the output set lead of flip-flop 102, a pulse is passed therethrough in the event that the seventh intelligence element is a marking signal. Similarly, a pulse is passed through gate 117 if the first intelligence element is a marking signal. Similarly, the output of monopulser 121 is connected to other gates, which gates, in turn, are connected to output set leads of corresponding flip-flops in the data shift register whereby these gates pass pulses in the event that the corresponding data shift flip-flops are storing marking signals.

The outputs of gates 115 through 117 are connected to the input set terminals of flip-flops 125 through 127 in a hold register, the hold register comprising eight flip-flops, each corresponding to a flip-flop in the data shift register. Accordingly, when gates 115 through 117 pass a pulse, the connected ones of gates 125 through 127 are set. Thus the marking elements stored in the data shift register are transferred to the hold register during the generation of the stop element.

The output set leads of each of the flip-flops in the hold register are connected to a corresponding gate circuit. For example, the outputs of flip-flops 125 through 127 are connected to gates 128 through 130, respectively. Thus, if a marking element is stored in a hold register flip-flop, the flip-flop is set and a high potential condition is applied to an input of the associated output gate. The other input to each of the associated output gates is connected in common to transfer pulse lead 238. When, as described hereinafter, a pulse is applied to lead 238, each of gates 128 through 130 is pulsed and a pulse is produced at the output thereof when the corresponding flip-flop in the hold register is storing a marking bit. Accordingly, the transfer pulse on lead 238 gates the eight intelligence elements through gates 128 through 130.

Lead 238 also extends by way of delay network 131 to monopulser 132. The output of monopulser 132, in turn, is connected to the input reset terminals of hold register flip-flops 125 through 127. Delay network 131 delays the application of the transfer pulse to monopulser 132 until the data character stored in the hold register is transferred through gates 128 through 130. After this delay, and upon the application of the delayed transfer pulse to monopulser 132, the input reset terminals of hold register flip-flops 125 through 127 are pulsed to reset the flip-flops and thus remove the data character.

The outputs of gates 128 through 130 are connected to the input set terminals of flip-flops 140 through 142, respectively. Flip-flops 140 through 142 are included in eight stages of a forty-stage store shift register, each of the eight stages corresponding to a flip-flop in the hold register. In addition, the store shift register includes thirty-two additional stages, whereby a total of forty stages are provided, the last stage thereof comprising flip-flop 143.

In general, as described in detail hereinafter, the data character stored in the hold register is transferred through gates 128 through 130 by the transfer pulse on lead 238 to the first eight stages of the store shift register, which stages include flip-flops 140 through 142. Subsequent thereto, shift pulses are applied to lead 252 to shift the data bit stored in each of the stages of the store shift register to the subsequent stages and upon the bit being shifted to the fortieth stage, flip-flop 143, the next shift pulse then recirculates the bit to the first stage flip-flop 140, where the process is repeated.

Recalling now that gates 128 through 130 pulse the input set leads of flip-flops 140 through 142 when the transfer pulse is applied to lead 238 and the associated ones of hold register flip-flops 125 through 127 are storing marking bits, it is seen that the eight intelligence elements of the data character are transferred to store shift register stages 140 through 142. As described hereinafter, the first register shift pulse is then applied to lead 252, which lead is connected to gates 146 and 147. Since the other inputs to gates 146 and 147 are connected to the output set and output reset terminal of flip-flop 140, and the outputs of gates 146 and 147 are connected to the input set and input reset terminals of flip-flop 141, the latter flip-flop is set by the shift pulse if flip-flop 140 is storing a marking bit and thereby providing a high potential condition at its output set terminal and flip-flop 141 is reset by the shift pulse if flip-flop 140 is storing a spacing bit, whereby a high potential condition is provided at its output reset terminal. Accordingly, the element bit in flip-flop 140 is shifted to flip-flop 141.

Simultaneously therewith, the shift pulse on lead 252 is applied to gates 144 and 145. With the other inputs to gates 144 and 145 connected to the output set and output reset terminals of the fortieth stage shift register flip-flop 143 and the outputs of gates 144 and 145 connected to the input set terminal and input reset terminal of flip-flop, it is apparent that the shift pulse concurrently shifts the bit in flip-flop 143 to flip-flop 140. In a similar manner, the bit stored in flip-flop 141 is shifted to the next subsequent stage, namely, stage three, not shown, the bit stored in the seventh stage, not shown, in the store shift register is passed by gate 148 or gate 149 to flip-flop 142, the bit stored in flip-flop 142 is shifted to the next subsequent stage and the bit stored in the thirty-ninth stage, not shown, of the store shift register, is shifted by way of gate 150 or 151 to flip-flop 143. Accordingly, the first shift pulse shifts the bit in each of the stages of the store shift register to the next subsequent stage and shifts the bit in the fortieth stage to the first stage. Similarly, each succeeding shift pulse applied to lead 252 shifts the bits in each stage to the subsequent stage and recirculates the bit in the last stage to the first stage.

The output signaling speed is controlled by free-running multivibrator 225 which applies a square wave pulse train to lead 226 as shown by wave A in FIG. 4. Each wave of the cycle has a duration of 6.7 milliseconds, whereby eleven pulses are produced in 73.3 milliseconds. Accordingly, eleven pulses or bits are generated corresponding to a data character having a signaling speed of 150 bits per second.

Lead 226 extends to the input of monopulser 160. As previously described, the output of monopulser 160 is connected to the input reset terminal of flip-flop 120 and the reset thereof operates monopulser 121 to transfer the data character from the data shift register to the hold register. Accordingly, after the application of the character pulse on lead 209 to flip-flop 120 the flip-flop is reset by monopulser 160 within 6.7 milliseconds. It is noted that the character pulse on lead 209 may occur simultaneously with the application of the leading edge of the pulse on lead 226 to monopulser 160. Accordingly, to insure that flip-flop 120 is set by the character pulse, the pulse interval of monopulser 208 is arranged to exceed the pulse interval of monopulser 160. Accordingly, at least a portion of the pulse on lead 209 will be applied to flip-flop 120 when monopulser 160 is not generating its pulse.

Multivibrator 225 also applies a pulse train to output lead 227. The pulse wave on lead 227, shown by wave B in FIG. 4, has the same pulse repetition rate as the pulses applied to lead 226 but are 180° out of phase. This is provided to eliminate any conflict between the transfer of the data character to the hold register and the transfer of the data character out of the hold register as described hereinafter.

Lead 227 extends to a binary counter, generally indicated by block 230 and, more specifically, to the input set and input reset terminals of the first stage of flip-flop 231. Accordingly, the leading edge of each of the pulses on lead 227 shifts the condition of flip-flop 231. The output reset terminal of flip-flop 231 is connected to the second stage flip-flop 232 of counter 230 and flip-flop 232 is similarly connected to flip-flop 233 and flip-flop 233 to flip-flop 234. Accordingly, flip-flops 231 through 234 are arranged as a binary counter to count the pulses on lead 227.

Gate 235 has three input leads extending therefrom to the output set terminals of flip-flops 231, 232 and 234. Gate 235 is thus enabled by a binary count of eleven to pass a pulse to lead 236 and lead 236, in turn, is connected to the input reset terminals of flip-flops 231 through 234 to reset the flip-flops. Thus binary counter 230 is arranged to count to eleven and upon this latter count being achieved, be reset to zero. This is generally indicated in FIG. 3 by the count line showing counts of one through ten and concurrent counts of eleven and zero.

The output of gate 235 also extends to the input of monopulser 237. Accordingly, upon a count of eleven by counter 230, a pulse is passed by gate 235 to monopulser 237 whereby a ten microsecond pulse is applied to transfer pulse lead 238. As previously described, transfer pulse lead 238 extends to gates 128 through 130 and to delay network 131. Accordingly, when counter 230 steps to the count of eleven, the character in the hold register is transferred to the first eight stages in the store shift register and monopulser 132 thereafter resets the hold register. It is noted that the transfer pulse on lead 238 occurs concurrently with the leading edge of the eleventh pulse applied to lead 227 by multivibrator 225. Since flip-flop 120 is reset by monopulser 160 which, in turn, is driven by the leading edge of a pulse applied to lead 226, and since the pulse on lead 226 is 180° out of phase with the pulse on lead 227, it is apparent that flip-flop 120 cannot be reset to shift the data character to the hold register concurrently with the application of the transfer pulse to lead 238 which transfers the character in the hold register to the store shift register.

The output of monopulser 237 is also connected to an input of gate 240, the other input of gate 240 being connected to lead 275, which latter lead is normally in the high potential condition, as described hereinafter. Accordingly, on the eleventh count of counter 230, monopulser 237 passes a pulse through gate 240 and then through OR gate 241 to the input of monopulser 242. Monopulser 242, in response thereto, provides a five microsecond pulse at the output thereof, which pulse is passed through lead 243 and diodes 155 through 157 in parallel to the input reset terminals of flip-flops 140 through 142, respectively. Accordingly, on the eleventh count of counter 230, the first eight stages of the store shift register are reset. It is recalled that simultaneously therewith, the transfer pulse is applied to lead 238 whereby the data character in the hold register is transferred to the store shift register. The transfer pulse on lead 238, however, has a duration of ten microseconds. Since this exceeds the duration of the pulse generated by monopulser 242, it is apparent that the marking bits transferred from the hold register will set the appropriate stages in the store shift register while the other stages in the store shift register not receiving marking bits are reset by monopulser 242. Accordingly, on the eleventh count, the character in the first eight stages of the store shift register is cleared and the character in the hold register is transferred thereto.

As previously described, the shift pulses for the store shift register are passed thereto by way of lead 252. As seen in FIG. 2, the shift pulses on lead 252 are derived from the output of gate 245. Gate 245, in turn, is controlled jointly by the pulses applied to lead 227 by multivibrator 225, and the output of inverter 246. The input to inverter 246 is derived from the outputs of gates 248 through 251 in parallel via OR gate 247.

The two inputs to gate 251 are connected to lead 226 and to the output set terminal of flip-flop 234 of counter 230. Accordingly, the output of gate 251 is positive during that interval of the eighth count of counter 230 when the pulse is applied to lead 226. The inputs to gate 249 extend to the output set terminals of flip-flop 231 and flip-flop 234. Accordingly, the output of gate 249 is positive during the ninth count of counter 230. The inputs to gate 250 are connected to the output set terminals of flip-flops 232 and 234, whereby the output of gate 250 is rendered positive during the tenth count of counter 230. Gate 248 has four input leads extending to the output reset terminals of flip-flops 231 through 234. The other input lead to gate 248 is connected to lead 227. Accordingly, the output of gate 248 is rendered positive during that portion of the zero count of counter 230 when multivibrator 225 applies a pulse to lead 227. Accordingly, the combined outputs of gates 248 through 251 applied by way of OR gate 247 to the input of inverter 246 as shown in wave C, FIG. 3, is rendered positive during the eighth count of counter 230 when the pulse is applied to lead 226, as shown in wave A, continues positive during the ninth and tenth counts of counter 230, and through that portion of the succeeding zero count which is concurrent with the application of the pulse to lead 227, as shown in wave B. It is thus seen that inverter 246 applies a positive potential to gate 245 starting at the approximate midpoint of the zero count and terminating at the approximate midpoint of the eighth count. With the other input lead of gate 245 extending to lead 227, the multivibrator pulse impressed thereon is thus passed to the output of gate 245, as shown in wave D. Accordingly, as further shown in wave D, eight pulses are applied to lead 252 during each cycle of counter 230, the initiation of the first pulse thereon occurring concurrently with the first count and each succeeding pulse of the subsequent seven occurring concurrently with each succeeding one of counts two through eight of counter 230.

The data characters in the store shift register are read out of the output reset terminal of flip-flop 142 by way of lead 152. Lead 152, in turn, extends to one input of gate 255, FIG. 2. The other input to gate 255 is connected to the output reset terminal of flip-flop 234 is counter 230. Accordingly, as shown in wave E in FIG. 4, counter flip-flop 234 applies a high potential condition to gate 255 during each of the counts zero through seven and the output of gate 255 during this interval is thus controlled in accordance with the conditions on output reset terminal of flip-flop 142. Thus, when gate 255 is enabled by flip-flop 234, a marking or one bit in flip-flop 142 applies a low potential condition to lead 152 and gate 255 passes a zero bit to inverter 257 by way of OR gate 256. Conversely, a spacing or zero bit stored in flip-flop 142 provides a high potential condition to lead 152 whereby gate 255 passes a high potential condition through OR gate 256 to inverter 257. Accordingly, with gate 255 enabled by counter flip-flop 234, inverter 257 applies a high potential condition or marking signal to output lead 258 when flip-flop 142 is storing a marking bit, and applies a low potential condition or spacing signal to output lead 258 when flip-flop 142 is storing a spacing bit.

The other input to OR gate 256 is connected to the output of gate 259. The two inputs to gate 259 are connected to the output set terminal of flip-flop 232 and the output set terminal of flip-flop 234 of counter 230. Accordingly, the output of gate 259 is rendered positive during the tenth count of counter 230, as shown in wave F of FIG. 4. This positive condition is applied by way of OR gate 256 to inverter 257, thereby impressing a negative voltage condition or spacing signal on output lead 258. This latter condition simulates the spacing start signal of the teletypewriter character.

Summarizing, when the counter reaches the count of eight, gate 255 is disabled, and with gate 259 also disabled, a high potential condition is impressed on output lead 258. This initiates the application of the marking stop signal of the teletypewriter character, which condition persists through counts eight and nine of counter 230. When counter 230 is driven to the count of ten, however, gate 259 is enabled whereby inverter 257 applies the start signal to output lead 258. The enabling of gate 259 is terminated when counter 230 reaches the count of eleven, and is reset to the count of zero, as previously described. At this time, however, gate 255 is enabled to read the condition on the output reset terminal of flip-flop 142 of the store shift register. Since, on the count of eleven the transfer pulse was also generated to transfer the character from the hold register to the store shift register, flip-flop 142 is presently storing the first intelligence element. Accordingly, the first intelligence element is transmitted out of lead 258 during the zero count of counter 230. When counter 230 is driven to the count of one, a shift pulse is provided, as previously described, thereby transferring the second intelligence element to flip-flop 142 and thus applying this element to output lead 258. Similarly, upon each successive count of counter 230, the successive intelligence elements of the data character are applied to output lead 258 until the completion of the seventh count, and the initiation of the eighth count, whereupon the two stop elements are again applied to lead 258, as previously described, and the start element is thereafter applied to lead 258 to initiate the transmission of a new data character.

As previously disclosed, the transmitted data characters include a parity check bit to insure that an intelligence bit is not lost in transmission. The remote station, not shown, is arranged in any manner well known in the art to compare the check bit with the weight of the information bits and return an error signal if a comparison is not obtained.

In the event that a character is mutilated in the transmission over lead 258 to the remote station, the error signal is returned over lead 260. This sets flip-flop 261 resulting in a high potential condition at the output set terminal, which is connected to one input of gate 262. The other input to gate 262 is connected to the output of monopulser 237. Thus, when an error signal is returned from the remote station, monopulser 237, upon the eleventh count of counter 230, applies a pulse through gate 262 to monopulser 263 and to the input set terminal of flip-flop 270.

The output of monopulser 263 is connected to the input reset terminal of flip-flop 261 and to the input reset terminals of flip-flops 266 through 268 of binary counter 265. Accordingly, when monopulser 263 is pulsed, the resultant output thereof resets flip-flop 261 and resets counter 265 to a zero count.

In addition, the pulse applied through gate 262 sets flip-flop 270. With flip-flop 270 set, the high potential condition at the output reset terminal si removed. Since the output reset terminal of flip-flop 270 is connected to lead 206, clutch magnet 203 is de-energized, as previously described, whereby teletypewriter 201 stops after the termination of the character concurrently being transmitted therefrom.

The output set terminal of flip-flop 270 is connected to one input of gate 272 and one input of gate 273. The setting of flip-flop 270 thus applies a high potential condition to these two latter gates.

As previously described, when teletypewriter 201 stops at the termination of a character transmission, the bit pulses generated by element timer 212 terminate. This, as previously described, permits the positive voltage build up of the charge on capacitor 217, whereby, after an interval corresponding to the duration of the transmission of an output character, Zener diode 218 breaks down and a positive-going transition is applied to lead 219. Since lead 219 extends to gate 273, which gate was previously enabled by flip-flop 270, a positive pulse is passed to the input set terminal of flip-flop 274. Accordingly, flip-flop 274 is set, removing the high potential condition from the output reset terminal. This, in turn, removes the enabling voltage applied by way of lead 275 to gate 240. Accordingly, gate 240 will not pass the subsequent pulses of monopulser 237, thus precluding the clearing of the first eight stages of the store shift register.

The setting of flip-flop 274 also produces a high potential condition at the output set terminal, which terminal is connected to one input of gate 272. As previously described, the setting of flip-flop 270 applies a high potential condition to another input to gate 272. Thus gate 272 will pass pulses applied to its third input terminal, which terminal is connected by way of lead 276 to the output of monopulser 237. Accordingly, gate 272 is now enabled upon each successive eleventh count of counter 230 and the consequent operation of monopulser 237 to pass the pulses produced thereby to binary counter 265.

Binary counter 265 is provided with three stages comprising flip-flops 266, 267 and 268. The output of gate 272 is connected to the input terminals of flip-flop 266 and flip-flop 266 is connected to flip-flop 267 and flip-flop 267 to flip-flop 268 in a conventional manner and arrangement to provide binary counting. Accordingly, each successive pulse from monopulser 237 advances counter 265 until the binary count of six is attained.

Gate 280 has one input lead connected to the output set terminal of flip-flop 267 and the other input lead connected to the output set terminal of flip-flop 268. Accordingly, when binary counter 265 attains the binary count of six, gate 280 is enabled to pass a pulse by way of delay network 281 to the input reset terminal of flip-flop 270 thereby resetting the flip-flop. It is noted that delay network 281 is provided to permit the termination of the pulse from monopulser 237, which pulse advances counter 265, before resetting flip-flop 270.

With flip-flop 270 reset, the output reset terminal is restored to the high potential condition, thereby re-energizing clutch magnet 203 of teletypewriter 201, permitting the teletypewriter to restart. This positive voltage transition is also applied to the input reset terminal of flip-flop 274 and flip-flop 274 reset, re-enables gate 240. In addition, the positive voltage transition at the output reset terminal of flip-flop 270 is passed by way of lead 282 and OR gate 241 to monopulser 242. Accordingly, the monopulser is operated and, as previously described, functions to clear the first eight stages of the store shift register. The error circuit is now restored, permitting the resumption of normal transmission.

Summarizing the sequence of operation and assuming a data message tape is inserted in teletypewriter 201, signaling contacts 204 apply the character bits to lead 205 and concurrently therewith, element timer 212 applies the bit pulses to lead 213. Accordingly, the intelligence elements of the data character are shifted into the data shift register. During the generation of the stop element of the data character, monopulser 208 applies a pulse to character pulse lead 209 setting flip-flop 120 which flip-flop is immediately thereafter reset by the pulse generated by monopulser 160. Accordingly, flip-flop 120 is reset and monopulser 121 transfers the data character from the data shift register to the hold register by way of gates 115 through 117. Immediately thereafter, teletypewriter 201 initiates the generation of the next teletypewriter character and the intelligence elements thereof are shifted into the data shift register in the same manner.

Recalling now that the first character is stored in hold register and assuming that clock multivibrator 225 has driven counter 230 to the tenth count, gate 259 is enabled, as previously described, applying a pulse to inverter 257 by way of OR gate 256. Accordingly, a spacing start element is applied to output lead 258. One bit duration thereafter, counter 230 advances to the eleventh count and thereupon is reset. Simultaneously therewith, gate 235 is enabled thus operating monopulser 237. Accordingly, monopulser 242 is operated to clear the first eight stages of the store shift register and lead 238 is pulsed, whereby a transfer pulse shifts the first character in the hold register to the first eight stages of the store shift register by way of gates 128 through 130. In addition, with the counter reset, gate 259 is disabled and gate 255 is enabled to read out the first intelligence bit in flip-flop 142 and apply the bit by way of OR gate 256 and inverter 257 to output lead 258. One bit interval thereafter, counter 230 is advanced to the first count and a shift pulse is concurrently applied to lead 252, as previously described. This advances each of the intelligence bits in the store shift register whereby flip-flop 142 now stores the second intelligence element which is read out by way of gate 255 to output lead 258. In addition, the first intelligence element of the fourth prior character is recirculated from flip-flop 143 and stored in flip-flop 140. Similarly, as counter 230 advances through the seventh count, the bits are concurrently advanced in the store shift register and the successive intelligence elements are read out through gate 255. Upon the counter advancing to the eighth count, the last intelligence element of the data character is advanced out of flip-flop 142 to the flip-flops subsequent thereto, and the intelligence elements of the fourth prior character are stored in the first eight stages. In addition, gate 255 is disabled and the stop signal is consequently applied to lead 258 by inverter 257. This condition then persists through the eighth and ninth counts of counter 230. Upon the tenth count thereof, a new start element is applied to lead 258, the first eight stages of the store shift register are cleared, and the next data character is transferred from the hold register to the store shift register. The sequence is thus repeated.

It is noted that the outgoing transmission speed which is assumed, for example, to be 150 bits per second, exceeds the signaling speed of teletypewriter 201, which is assumed to be 110 bits per second. Accordingly, the outgoing circuit will transmit out a character faster than teletypewriter 201 can supply characters to the hold register. When this occurs, recalling that the transfer pulse resets the hold register after every read out, it is obvious that all of the flip-flops of the hold register will be reset, and a blank character transferred into the store shift register. Accordingly, when teletypewriter 201 falls behind the output circuit, the hold register inserts a "blank" or an all-spacing character into the store shift register, permitting teletypewriter 201 to catch up to the output circuit.

Assume now that an outgoing data character is mutilated and the remote station returns an error signal to set flip-flop 261. Accordingly, when counter 230 attains the count of eleven, monopulser 237 applies a pulse through gate 262 to the input set terminal of flip-flop 270, whereupon the energizing path of clutch magnet 203 is disabled. Accordingly, teletypewriter 201 concludes the generation of the character concurrently being transmitted therefrom and stops. Meanwhile, this concurrent character has been shifted into the data shift register and transferred to the hold register at the conclusion of the transmission thereof by teletypewriter 201. When counter 230 again attains the count of eleven, monopulser 237 provides a pulse to monopulser 242 to clear the first eight stages of the store shift register and provides a transfer pulse to lead 238 to transfer the character from the hold register to the store shift register. The character is thus transmitted out over lead 258 as previously described. In addition, as previously described, the timing circuit which includes capacitor 217 and Zener diode 218 times out to set flip-flop 274. Recalling now that this occurs after an interval corresponding to one outgoing character duration after teletypewriter 201 stops, it is apparent that flip-flop 274 is set during the outgoing transmission of the character. Accordingly, at the termination of the outgoing transmission of the character, with flip-flop 274 set, the output pulse of monopulser 237 is passed by way of lead 276 to counter 265 to advance the counter to the count of one. It is noted at this time that flip-flop 274 has disabled gate 240 to preclude the clearing of the first eight stages of the store shift register. In addition, since teletypewriter 201 has stopped, the hold register is empty and gates 128 through 130 do not gate down any bits in response to the application of the transfer pulse to lead 238. Accordingly, the character fourth prior to the outgoing character which has been recirculated through the first eight stages of the store shift register is not cleared out and is thus transmitted out to lead 258.

In a similar manner, each successive one of the prior characters is transmitted out and at the conclusion of each character, monopulser 237 advances counter 265 until the last character generated by teletypewriter 201 is retransmitted out over lead 258, whereupon counter 265 attains the count of six. Thereupon, counter 265 resets flip-flop 270 and, as previously described, flip-flop 270 restarts teletypewriter 201, clears the first eight stages of the store shift register, and resets flip-flop 274, restoring the error circuit to its initial idle condition. It is noted at this time that the first eight stages of the store shift register are clear and the blank character is transmitted to lead 258. The next subsequent character will also be a blank and the character thereafter will be the first generated character of the restarted teletypewriter.

Although a specific embodiment of this invention has been shown and described, it will be understood that various modifications may be made without departing from the spirit of this invention and within the scope of the appended claims.

What is claimed is:

1. In a system for repetitive transmission of blocks of data characters in response to an external signal, each of said characters comprising a plurality of data bits, a source of data characters, buffer storage means connected to said source for assembling said data bits, a recirculating shift register connected in a ring and having a first portion for storing the data bits of a single character and a second portion for storing the data bits of a plurality of characters, an output circuit for transmitting the character in said first portion, said output circuit including a clock circuit for shifting said character bits around said recirculating register, means responsive to said output circuit for sequentially clearing said first portion and transferring said assembled data bits from said buffer storage means to said first portion after said transmission of the character therein, means responsive to said external signal for disabling said source, and means responsive to said disabled source for precluding said clearing of said first portion.

2. In a system for repetitive transmission of blocks of data characters in response to an external signal, each of said characters comprising a plurality of data bits, a source of data characters, buffer storage means connected to said source for assembling said data bits, a recirculating shift register connected in a ring and having a first portion for storing the data bits of a single character and a second portion for storing the data bits of a plurality of characters, an output circuit for transmitting the character in said first portion, said output circuit including a clock circuit for shifting said character bits around said recirculating register, means responsive to said output circuit for sequentially clearing said first portion and transferring said assembled data bits from said buffer storage means to said first portion after said transmission of the character therein, means responsive to said external signal for disabling said source, means responsive to said disabled source for precluding said clearing of said first portion, and means responsive to said precluding means for re-enabling said source after transmission of said plurality of characters and said single character storage in said shift register.

3. In a system for repetitive transmission of blocks of data characters in response to an external signal, each of said characters comprising a plurality of data bits, buffer storage means for assembling said data bits, a source of data characters for sequentially applying during each operation thereof a data character to said buffer storage means, a recirculating shift register connected in a ring and having a first portion for storing the data bits of a single character and a second portion for storing the data bits of a plurality of characters, an output circuit for transmitting the character in said first portion, said output circuit including a clock circuit for shifting said character bits around said recirculating register, means responsive to said output circuit for sequentially clearing said first portion and transferring said assembled data bits from said buffer storage means to said first portion after said transmission of the character therein, means responsive to said external signal and effective after said transmission of said character in said first portion for disabling said source at the conclusion of said operation thereof, and means responsive to said disabled source for precluding said clearing of said first portion.

4. In a system for repetitive transmission of blocks of data characters in response to an external signal, each of said characters comprising a plurality of data bits, a source of data characters, a first shift register connected to said source and having a plurality of stages equal in number to said plurality of data bits for assembling said data bits, a second shift register having a plurality of stages equal in number to said plurality of data bits, an output circuit for transmitting bits stored in a final one of said second shift register stages, a third shift register having a plurality of stages equal in number to an integral multiple of said plurality of data bits for storing said integral number of characters, means for connecting an initial one of said third shift register to said final stage of said second shift register and for connecting an initial one of said second shift register stages to a final one of said third shift register stages, means responsive to said output circuit for sequentially clearing said second shift register and transferring the assembled bits, in parallel, from said first shift register to said second shift register, means responsive to said external signal for disabling said source, timing means responsive to said source and operative a predetermined interval after said disabling thereof for precluding said clearing of said second shift register, and means responsive to said disabling means and operative after transmission of said integral number of said characters by said output circuit for re-enabling said source.

5. In a system for repetitive transmission of blocks of data characters in response to an external signal, each of said characters comprising a plurality of data bits, a source of data characters, a first shift register connected to said source and having a plurality of stages equal in number to said plurality of data bits for assembling said data bits, a second shift register having a plurality of stages equal in number to said plurality of data bits, an output circuit for transmitting bits stored in a final one of said second shift register stages, a third shift register having a plurality of stages equal in number to an integral multiple of said plurality of data bits for storing said integral number of characters, means for connecting an initial one of said third shift register to said final stage of said second shift register and for connecting an initial one of said second shift register stages to a final one of said third shift register stages, means responsive to said output circuit for clearing said second shift register and further means responsive to an output circuit for transferring the assembled bits, in parallel, from said first register to said second shift register, receiving means responsive to said external signal for disabling said source, timing means responsive to said source and operative a predetermined interval after said disabling thereof for disabling said clearing means, and means responsive to said timing means and operative after transmission of said integral number of said characters by said output circuit for re-enabling said source and said clearing means.

6. In a system for repetitive transmisison of blocks of data characters in response to an external signal, each of said characters comprising a plurality of data bits, a source of data characters, a first shift register connected to said source and having a plurality of stages equal in number to said plurality of data bits for assembling said data bits, a recirculating shift register connecting in a ring and having a first and second portion, said first portion having a plurality of stages equal in number to said plurality of data bits and said second portion having a plurality of stages equal in number to an integral multiple of said plurality of data bits for storing said integral number of characters, an output circuit for transmitting bits stored in a final one of said first portion shift register stages, said output circuit including a clock circuit for shifting bits around said recirculating register, means responsive to said output circuit for clearing said first portion after the transmission of said plurality of bits forming a character, means responsive to said clearing means for transferring the assembled bits from said first shift register to said first portion of said recirculating shift register, means responsive to said external signal for disabling said source, timing means responsive to said disabled source for disabling said clearing means, and means responsive to said timing means and operative after transmission of said integral number of characters by said output circuit for re-enabling said source and said clearing means.

7. In a system for repetitive transmission of blocks of data characters in response to an external signal, each of said characters comprising a plurality of data bits, a source of data characters including cyclic operable means for generating serial bits of one character during each cycle thereof and means effective upon the termination of said cycle for releasing said cyclic operable means for the next successive cycle, a first shift register connected to said source and having a plurality of stages equal in number to said plurality of data bits for assembling said data bits, a recirculating shift register connecting in a ring and having a first and second portion, said first portion having a plurality of stages equal in number to said plurality of data bits and said second portion having a plurality of stages equal in number to an integral multiple of said plurality of data bits for storing said integral number of characters, an output circuit for transmitting bits stored in a final one of said first portion shift register stages, said output circuit including a clock circuit for shifting bits around said recirculating register, means responsive to said output circuit for clearing said first portion after the transmission of said plurality of bits forming a character, means responsive to said clearing means for transferring the assembled bits from said first shift register to said first portion of said recirculating shift register, means responsive to said external signal for disabling said releasing means whereby said cyclic operable means stops at the termination of the cycle, and delay means responsive to said cyclic operable means for disabling said clearing means a predetermined interval after said cyclic operable means stops.

No references cited.

ROBERT C. BAILEY, *Primary Examiner.*

G. D. SHAW, *Assistant Examiner.*